United States Patent [19]

Schertler

[11] 4,052,036
[45] Oct. 4, 1977

[54] SLIDING DEVICE FOR THE GAS-TIGHT AND AIR-TIGHT CLOSURE OF A CONTAINER OPENING OR OF A CONDUIT

[75] Inventor: Siegfried Schertler, Haag, Switzerland

[73] Assignee: Vat Aktiengesellschaft fur vakuum-apparate-technik, Haag, Switzerland

[21] Appl. No.: 596,121

[22] Filed: July 15, 1975

[30] Foreign Application Priority Data

July 15, 1974 Switzerland .................. 9738/74

[51] Int. Cl.$^2$ ........................................... F16K 51/00
[52] U.S. Cl. .................................. 251/144; 251/167; 251/204; 251/197
[58] Field of Search ............... 251/197, 199, 167, 204, 251/144

[56] References Cited

U.S. PATENT DOCUMENTS

| 2,789,582 | 4/1957 | Dunham | 251/197 X |
| 2,986,371 | 5/1961 | Knox | 251/197 X |
| 3,237,916 | 3/1966 | Bryant | 251/204 X |
| 3,352,535 | 11/1967 | Power | 251/204 |

FOREIGN PATENT DOCUMENTS 1,945,901   10/1970   Germany .................. 251/197

Primary Examiner—Harold W. Weakley
Attorney, Agent, or Firm—Sughrue, Rothwell, Mion, Zinn and Macpeak

[57] ABSTRACT

A gate value having a sealing plate carried by a moveable element which through the coaction of a series of balls presses the sealing plate into a flow preventing position.

21 Claims, 6 Drawing Figures

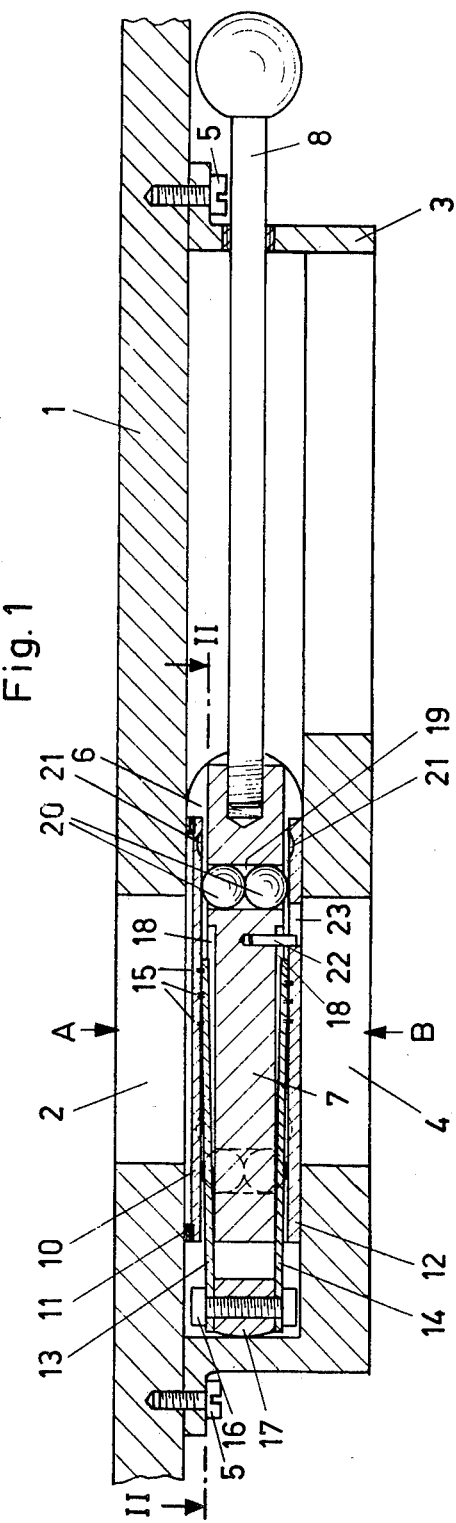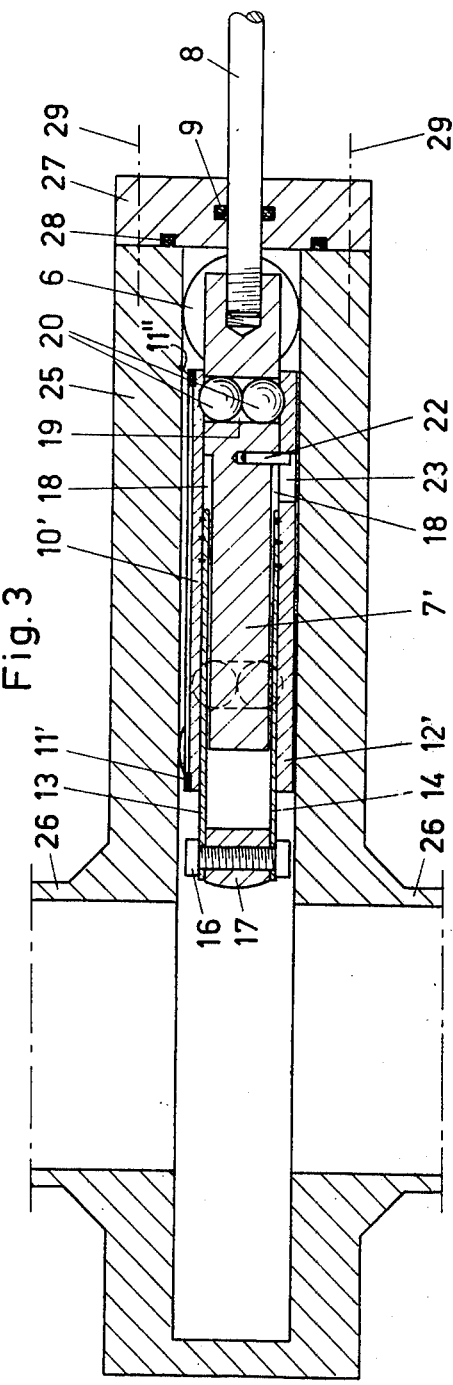

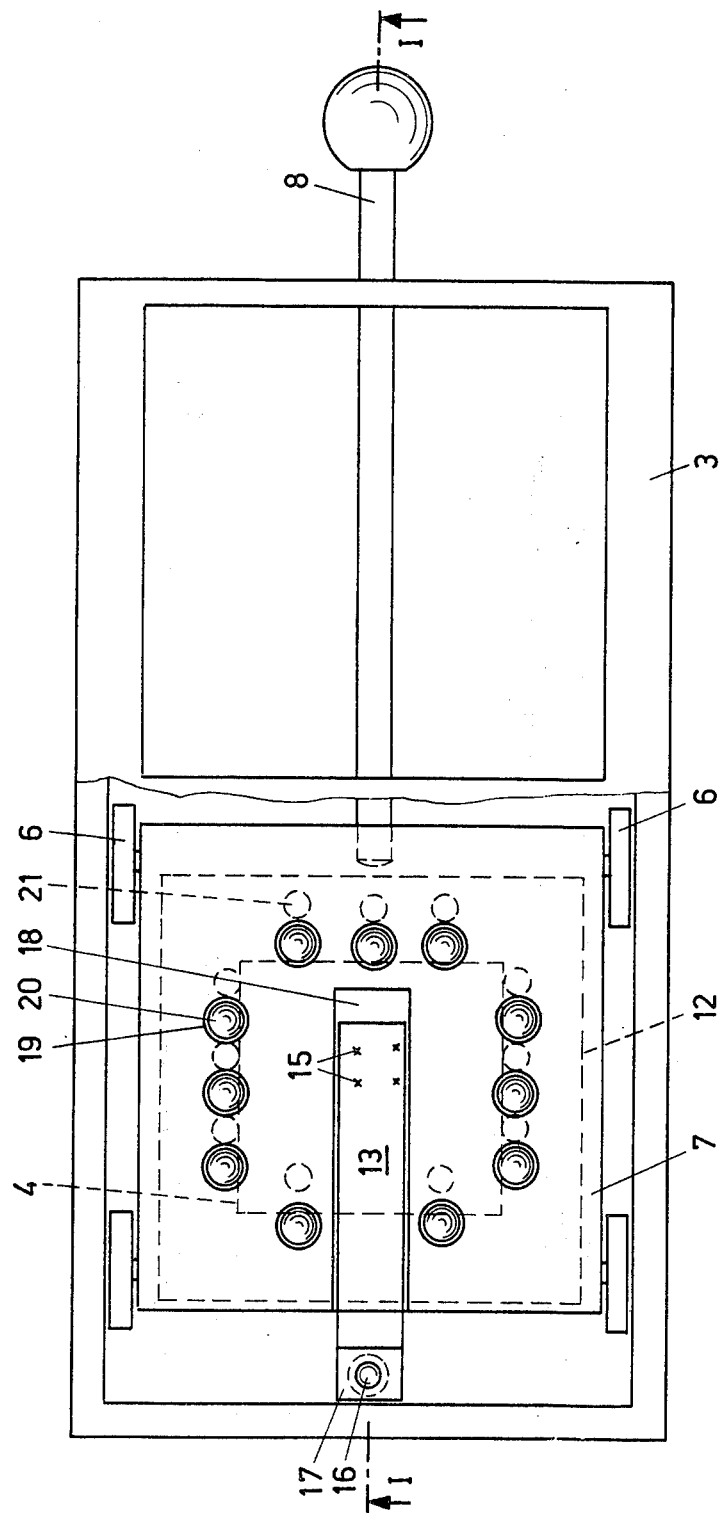

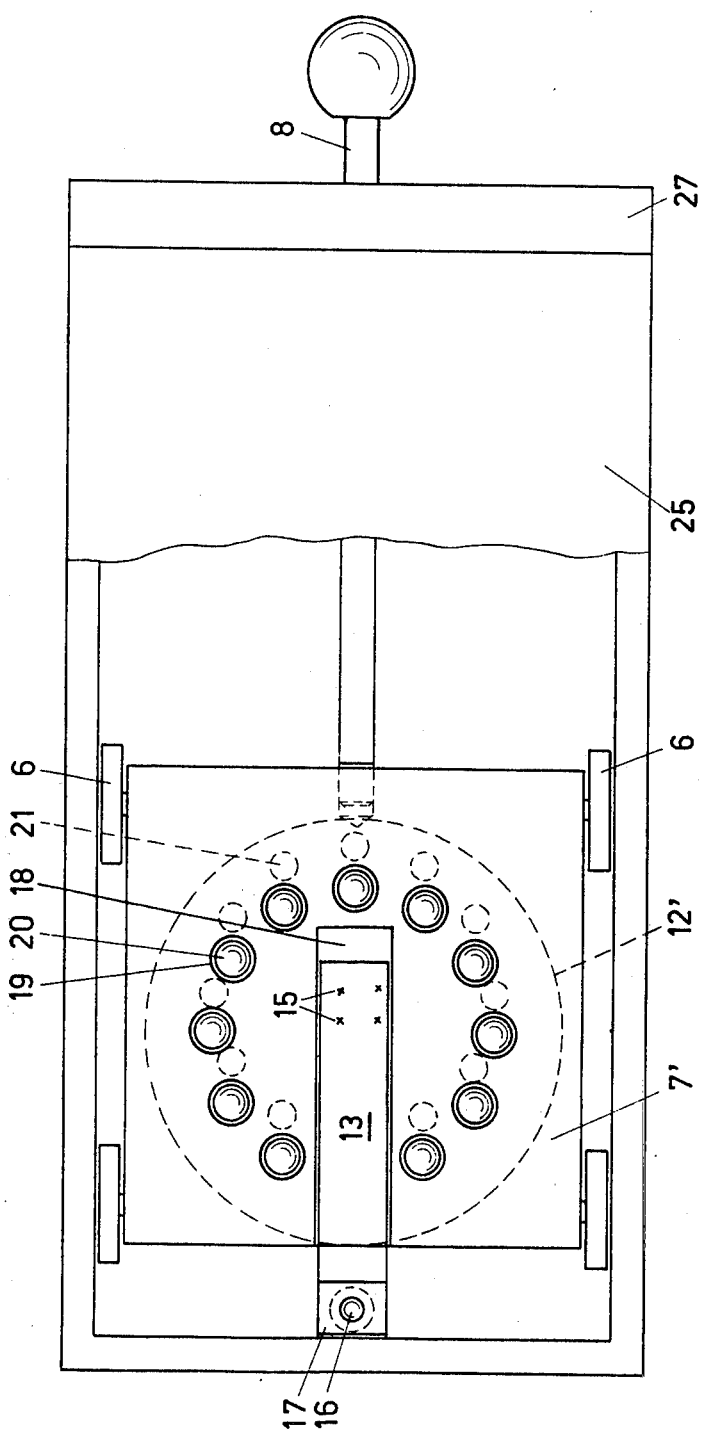

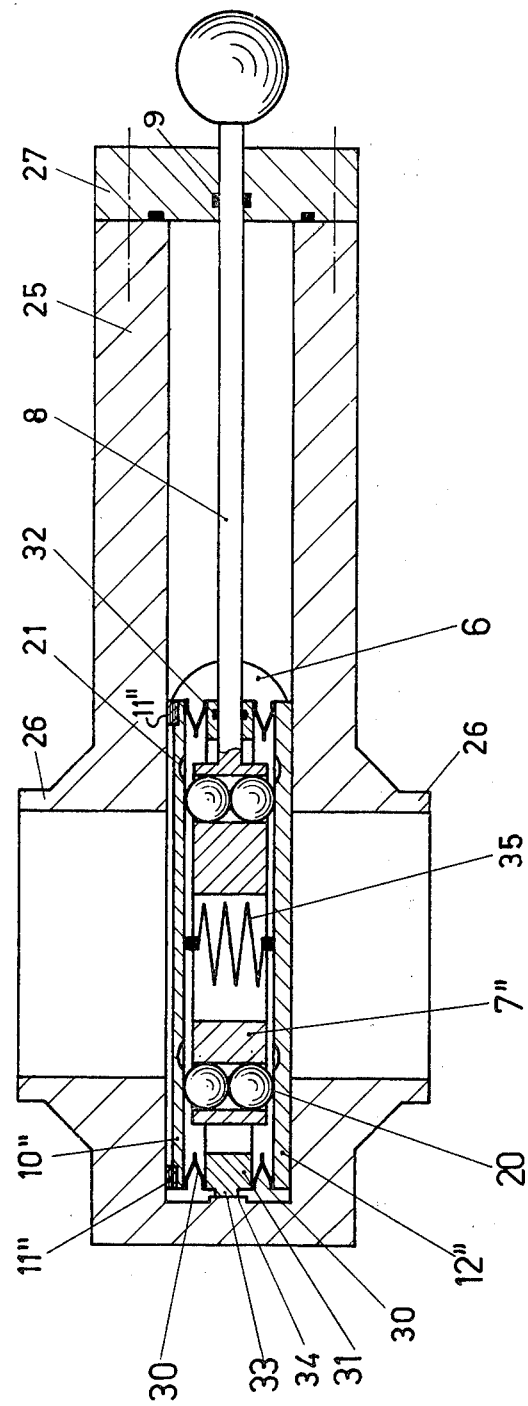
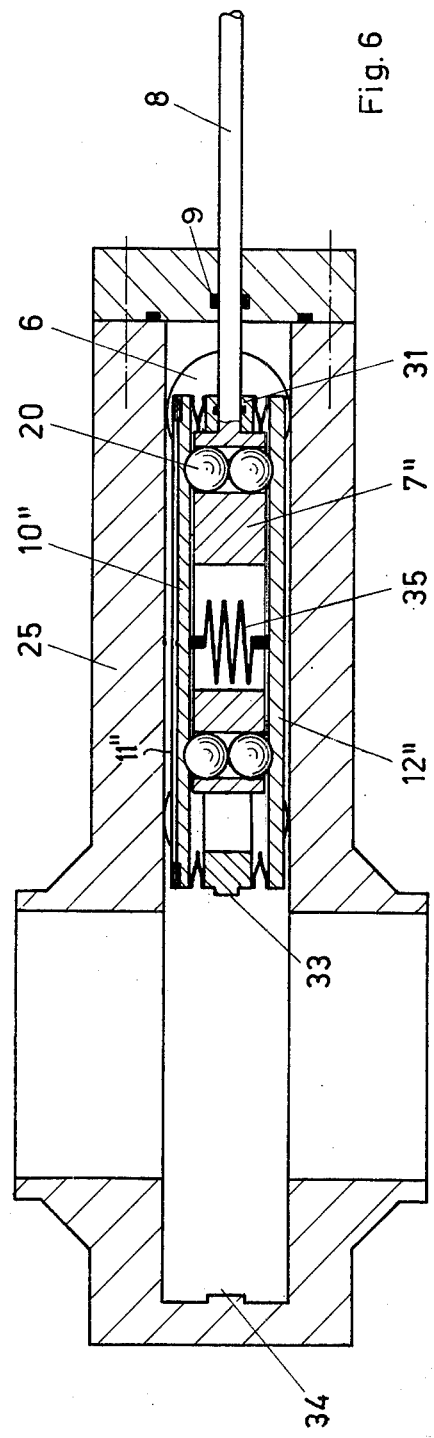

SLIDING DEVICE FOR THE GAS-TIGHT AND AIR-TIGHT CLOSURE OF A CONTAINER OPENING OR OF A CONDUIT

BACKGROUND OF THE INVENTION

1. Field of the Invention

The present invention relates to a sliding device for the gas-tight and air-tight closure of a container opening of given size or of a conduit having a specific inner diameter. The device comprises a locking member which is displaceable by means of a push rod and which comprises a sealing plate having a counter element connected therewith by means of a spring member. In the locking member, spreading elements are provided which rest against the sealing plate and the counter element to spread them apart after the locking member has been moved into the closing position and to press the sealing plate onto a seat of the container or conduit in a seal-tight manner through the intermediary of a seat packing.

2. Description of the Prior Art

A frequent requirement of shutoff sliding devices is that they can be mounted in the conduit as required without regard to the direction of flow. This requirement presupposes that the seal-tightness at the sealing plate or valve plate remains unchanged regardless of which side of the plate is exposed to overpressure or thrust pressure as a result of the blocked flow.

If the shutoff sliding device is mounted in the conduit in such a way that the overpressure presses the valve plate-and thus the packing-onto the valve seat, the sealing pressure is additive to the pressure and thus, with increasing overpressure, the seal-tightness is increased. However, if the shutoff sliding device is mounted in the conduit in such a way that the overpressure produced at the closed valve plate is effective in the opposite direction to the sealing force, the latter is reduced by the overpressure and constructional measures must be adopted which are so costly, particularly in the case of large shutoff sliding devices, that in most cases it is not possible to meet the requirement—which is feasible as such — of providing seal tightness in each direction in the case of overpressure.

This restriction is applicable, in particular, to all shutoff sliding devices, as must have a very high degree of seal-tightness which is essential in the case of high vacuum sliding devices. It also applies to the shutoff sliding devices disclosed in U.S. Pat. No. 3,368,792. In the case of the shutoff sliding devices described in the aforementioned patents, the locking member comprises as its spreading elements at least one pair of bearings which are loosely inserted one above the other in an appropriate continuous bore in the locking member. The combined diameter of the two bearings is greater than the length of the bore and the valve plate, and a counter plate comprises oppositely disposed recesses in which the bearings are inserted in the opening position of the locking member and which the bearings are forced to vacate by the closing movement of the push rod, thereby spreading apart the plates when the valve plate is disposed opposite its seat.

The same difficulties also arise in the case of a sliding device of the type described initially when it is intended for use as a gas-tight and air-tight closure of a container, more particularly, as the doors of a pressure capsule, for example, in connection with training and test capsules and annexed lock chambers for astronautical projects.

In the case of systems of this type, the overpressure may occur alternately on either side of the locking doors, and thus it is necessary to provide expensive reinforcement devices such as clamps with spindles for occasions when the overpressure exerted on the closed sealing plate is effective in the opposite direction to the sealing force.

However, devices of the above type are not only undesirable because they are very expensive but, above all, because the operation of these devices is time consuming. In the case of astronautical test capsules it is essential that in an emergency, for example, in the event of damage to the pressure suit of the person undergoing the test in the pressure capsule, that the access door can be opened within a very few seconds. This is impossible when additional reinforcing devices have to be provided.

SUMMARY OF THE INVENTION

The object of the present invention is to provide a sliding device of the type described initially for the gas-tight and air-tight closure of a container opening or of a conduit, wherein the sealing force at the seat is increased by the overpressure which is produced at the sealing plate even when the overpressure is exerted in the opposite direction to the sealing force.

According to the invention, the sliding device is characterized in that a plurality of spreading elements are disposed in the locking member along a single closed line which, in the closing position of the locking member, is located between the inner boundary line of the seat packing and the boundary line of the opening in the container or the conduit, such that overpressure which is produced at the sealing plate and which is directed in the opposite direction to the sealing pressure at the seat causes deflection of the sealing plate and, as a consequence, the seat packing is pressed onto the seat.

Other objects, features, and advantages of the present invention will be made apparent from the following detailed description thereof, which is provided with reference to the accompanying drawings.

BRIEF DESCRIPTION OF THE DRAWINGS

FIG. 1 is a sectional view at right angles to the container wall and along the line I—I in FIG. 2 of a sliding device intended for closing a container opening. It is shown in the locked and, thus, closed position.

FIG. 2 is a sectional view parallel to the container wall along the line II—II in FIG. 1 of the sliding device according to FIG. 1. It is represented in the same position as in FIG. 1.

FIG. 3 is a sectional view along a conduit of a sliding device employed as the shutoff slide of a conduit. It is represented in the open position.

FIG. 4 is a sectional view at right angles to the conduit of the shutoff slide according to FIG. 3. It is represented in the locked, closed position.

FIG. 5 is a sectional view along a conduit of another sliding device which is represented in the locked, closed position. This sliding device is designed as the shutoff slide for a conduit and it comprises protective features which enable it to be used with polluted or corrosive media.

FIG. 6 shows the shutoff slide according to FIG. 5 in the open position.

DESCRIPTION OF THE PREFERRED EMBODIMENTS

Referring now to FIGS. 1 and 2 in which a container wall 1, for example, the wall of a pressure capsule or pressure chamber comprises a rectangular opening or passage 2 about which is disposed a frame 3 which comprises an opening 4 corresponding to the container opening 2 and which is bolted to the container wall 1 by means of bolts 5. A locking plate 7 which is displaceable parallel to the container wall 1 on rollers 6 is disposed between the frame 3 and the container wall 1. Displacement of the plate 7 is effected from without by means of a push rod 8. As in the case of the embodiment represented, the rod 8 can be operated manually or by an electrical or pneumatic drive means. The rod 8 is guided through a bore in the frame 3 and is sealed by means of a packing 9. Alternative packing elements such as spring bellows can be provided in place of the packing member 9 which is represented as a packing ring.

The sliding device in point, which is designed as the closing member for a container opening 2, comprises a sealing plate 10 bearing a seat packing II and a counter plate 12, both of which are rectangular. Leaf springs 13 and 14 are attached, for example, by spot welding, to the sealing plate 10 and the counter plate 12, respectively, at the points 15. The two leaf springs 13, 14 are secured by means of a bolt 16 to a stop piece 17 disposed without the locking plate 7. The sealing plate 10 and the counter plate 12 are clamped against the locking plate 7 by means of the leaf springs 13, 14 (FIG. 3). To enable the plates 10, 12 to rest against the plate 7, the latter is provided with grooves 18 in which the leaf springs 13, 14 and thus the sealing plate 10 and the counter plate 12 are guided.

Bores 19, in each of which a pair of bearings 20 are inserted one above the other, are provided along a rectangular line in the locking plate 7 (FIG. 2). The combined diameter of the two bearings is greater than the length of the bores 19 or than the thickness of the locking plate 7. Recesses 21 are provided on the inner side of the sealing plate 10 and the counter plate 12. The disposition of the recesses 21 along a rectangular line corresponds to that of the bores 19 but the rectangle of the recesses 21 is offset with respect to the rectangle of the bores 19 in the direction of the axis of the rod 8 by a distance which forms the locking stroke. The parts of the bearings 20 projecting beyond the outer faces of the locking plate 7 project into the recesses 21 each time the plate 7 and the sealing plate 10 and the counter plate 12 are pushed within the frame 3.

A pin 22 is also inserted in the locking plate 7 at right angles to the latter. The pin 22 projects into an opening 23 in the counter plate 12. The size of this opening 23 in the direction of the axis of the rod 8 corresponds generally to that of the afore-mentioned locking stroke.

It may be noted from FIGS. 1 and 2 that in the closed, locked position of the locking plate 7, the closed rectangular line along which are disposed the bores 19, resp., the bearings 20, is located between the line formed by the seat packing 11 and the boundary line of the openings 2 and 4 in the container wall 1 or in the frame 3.

The present sliding device may be constructed in a similar manner when it is designed for use as a shutoff slide for a conduit. FIG. 3 shows a section along the conduit of this type of shutoff slide member in an open position. FIG. 4 shows a section at right angles to the conduit of this shutoff slide member in the closed, locked position. In these figures the reference numbers according to FIGS. 1 and 2 have been used to designate identical parts.

In the embodiment represented in FIGS. 3 and 4, a slide housing 25, which in FIG. 3 comprises only partially represented conduit connection ends 26, is provided with a cover 27 which is bolted to the housing 25 by means of a packing 28 and bolts 29 (not shown-merely indicated). Disposed inside the housing is a plate 7' which is displaceable on the rollers 6 at right angles to the axis of the conduit. As in the case of FIGS. 1 and 2, the push rod 8 is provided for the displacement of the plate 7'. The push rod 8 is guided through a bore in the cover 27 and is sealed by the packing 9.

The shutoff slide represented comprises as its sealing plate a valve plate 10' comprising a seat packing 11' and as its counter plate the plate 12'. The disposition of the leaf springs 13, 14 and the stop piece 17 corresponds to that of FIGS. 1 and 2.

In the case of the plate 7', bearings 20 are once again loosely inserted in pairs in the bores 19 and the combined diameter of the two bearings 20 is greater than the length of the bores 19 or than the thickness of the panel 7'. The bores 19 are provided along a circle which is located between the circle formed by the seat packing 11' and the boundary circle of the inner openings of the conduit connection ends 26. The recesses 21 are provided on the inner sides of the valve plate 10' and the counter plate 12'. The disposition of the recesses 21 along a circle corresponds to that of the bores 19 but, in the closed, locked position of the plate 7' (FIG. 4), the center of the circle of recesses 21 is offset in the direction of the axis of the rod 8 by the locking stroke with respect to the center of the circle of bores. As in FIG. 1, the plate 7' comprises the pin 22 and the counter plate 12' comprises the corresponding opening 23.

The sliding devices which have been described operate in the following manner: To close the shutoff slide represented in the open position in FIG. 3, or to close the sliding device according to FIGS. 1 and 2 which is in the form of doors, the push rod 8 is pushed towards the conduit axis or the openings 2,4 until the stop piece 17 touches the housing 25 on the side opposite to the housing cover 27 or the frame 3. In this position, which is not represented, the sliding device is still unlocked, but the valve plate 10' or the sealing plate 10 and the counter plate 12' or counter plate 12 are disposed in their closing position with respect to the conduit or the wall opening. However, they are still held against the plate 7 by the action of the leaf springs 13, 14. As force continues to be exerted by the rod 8 in the same direction, only the plate 7 or the plate 7' can continue to be displaced. In the course thereof, the pairs of bearings 20 are pressed out of the recesses 21, which causes the valve plate 10' or the sealing plate 10 and the packing 11' or 11 to be pressed against the valve seat and the counter plate 12' or counter plate 12 to be pressed against the housing or the frame. During this process, the leaf springs 13, 14 are spread apart, and the pairs of bearings 20 disposed in a circle or rectangle lock the two plates 10', 12' or the plates 10,12 in place in a force-locking manner and prevent them being opened by virtue of pressure produced on either side (FIG. 1).

If pressure is exerted on the valve plate 10' or the sealing plate 10 in direction B (FIG. 1), the seat packing is also pressed with increasing pressure. However, if the pressure is exerted from direction A onto the valve plate 10' or the sealing plate 10, the latter will be deflected in direction A between the pairs of bearings in a similar manner to a lever arm. The pairs of bearings 20 form fixed supports which cannot yield, and thus the outer edge of the valve plate 10' or the sealing plate 10 increasingly presses the packing against the seat. Thus, it is apparent that a sealing force must be applied during the closing of the sliding device. This is necessary to keep the closure sealed when there is no differential pressure at the valve plate 10' or at the sealing plate 10. If overpressure is produced on either side of the valve plate 10' or the sealing plate 10, it will tend to increase the sealing pressure.

The process is reversed during opening of the sliding devices which have been described. When the rod 8 is pulled, at first only the plate 7' or 7 between the plates 10', 12' or the plates 10, 12, is displaced. As soon as the pair of bearings 20 fall into the recesses 21 of the plates 10', 12' or the plates 10, 12, the latter can be raised from seat and the housing or the frame under the action of the leaf springs 13, 14, and thus the plate 7 or 7' together with the plates 10', 12' or the plates 10, 12 can be pulled away from the opening in the conduit or the wall into the position represented in FIG. 3. When the plate 7 is first moved into the unlocked position, which is not represented, the pin 22 is displaced within the opening 23 until it strikes the edge of the opening and, as the rod 8 continues to be pulled, it carries with it the counter plate 12' or the counter plate 12 and thus also the valve plate 10' or the sealing plate 10 in the drawing direction. This measure is designed to prevent the pair of bearings 20 from being pressed out of the recesses during the continued drawing action on the rod 8, if the valve plate 10' or the sealing plate 10 should adhere to the seat or should be pressed against the seat in the manner described as a result of a still present pressure difference.

The sliding devices according to the invention also have the advantage that only minimal forces are produced during the closing process, and therefore all the mechanical parts may have smaller dimensions than in the case of the known closing devices. The action of wear on these devices is also substantially reduced. It is also possible for these devices to be opened immediately, which, as has already been mentioned, is particularly expedient in the event of an emergency when the sliding device is used as the doors of a pressure chamber.

In the case of the embodiments which have been described and represented, the closing plate 7, 7' does not fulfil a sealing function. It is therefore unnecessary to use for this part a plate which is capable of covering the entire wall opening or entire conduit cross-section. When the present sliding device is used as the doors of a pressure chamber, it is possible to use a frame in which the pair of bearings 20 are disposed in place of the locking plate 7. When the sliding device is used as a shutoff slide for a conduit, a ring can be provided in place of the locking plate 7'. The counter element 12, 12' which is represented as a plate in FIGS. 1 and 3 can also be constructed in a similar manner.

In the embodiments represented, pairs of bearings which are known per se are provided as the simple, readily mounted spreading elements for the sealing plate and the counter plate, resp., the valve plate and counter plate. Obviously, it is also possible to use spreading elements having a different configuration which press apart the sealing plate and the counter plate and thus press the sealing plate onto the seat during the movement of the locking plate into the closing position and then into the locking position.

When the sliding devices according to the present invention are used in containers or conduits designed to hold a polluted or corrosive medium it is expedient to prevent the critical, inner mechanical parts of the sliding device located between the sealing plate 10 or 10' and the counter plate 12 or 12' from being soiled or damaged by the chemical action of the medium. A sliding device which has been designed for this purpose is represented in FIGS. 5 and 6. In FIG. 5 the sliding device is in the locked, closed position and in FIG. 6 in the open position. The embodiment represented consists of a shut-off slide for a conduit and its general configuration corresponds to that of the embodiment represented in FIGS. 3 and 4. Accordingly, identical components have been given the same reference numbers and will not be described in further detail.

According to FIG. 5, a locking plate 7" which is displaceable on the rollers 6 at right angles to the conduit axis is disposed within the housing 25 comprising the conduit connection ends 26 and the cover 27 which is bolted to the housing 25. A push rod 8 which is guided through a bore in the cover 27 is provided for the displacement of the locking plate 7".

The sealing plate again consists of a valve plate 10" comprising a seat packing 11', and the counter plate consists of a counter plate 12". The valve plate 10" and the counter plate 12" are connected in a seal-tight manner by means of bellows 30 with a supporting ring 31 provided between the valve plate and the counter plate, thereby producing an hermetically sealed, closed intermediate chamber in which the locking plate 7" is disposed. As in the embodiment according to FIG. 3, the closing plate 7" contains a plurality of pairs of bearings 20, and the valve plate 10" and the counterplate 12" also comprise recesses 21 for engagement of the bearings.

For the displacement of the locking plate 7", the supporting ring 31 comprises an opening in which a packing 32 is inserted. This opening enables the push rod, which is rigidly connected to the locking plate 7", to be guided in a seal-tight manner through the support ring 31. In this embodiment the rollers 6 are not mounted on the locking plate 7", but on the support ring 31. An abutment face 33 forms part of the support ring 31 and is in contact with the housing part 34.

For reasons of space it would be difficult to use the leaf springs 13, 14 according to FIG. 3 for clamping the valve plate 10" and the counter plate 12" against the locking plate 7". Instead, a tension spring 35 is provided which is attached to the valve plate 10" and to the counterplate 12". When the sliding device shown in FIG. 6 is in the unlocked state, the tension spring 35 retains the valve plate 10" and the counter plate 12" on or close to the locking plate 7".

The sliding device which has been described with reference to FIGS. 5 and 6 operates in the same manner as the one represented in FIG. 3, but in FIGS. 5 and 6 the pin 22 of FIG. 3 is not required for the reasons indicated hereinafter. When the rod 8 is pulled, the only element which is displaced at first is the locking plate 7" disposed between the plates 10" and 12" and within the support ring 31, the dimensions of which are larger than the outer dimensions of the locking plate 7" — as is apparent from FIG. 5. As soon as the two bearings 20 fall into the recesses 21 of the valve plate 10" and the counter plate 12", the plates 10", 12" can be moved away from the housing 25 by the force of the tension spring 35, and thus the locking plate 7" and the support ring 31 with the plates 10", 12", which are connected therewith, can now be pulled out of the conduit opening. The open position of the sliding device is represented in FIG. 6. It may also be noted from FIG. 6 that when the rod 8 is pulled, not only do the two bearings 20 fall into the recesses 21, but the locking plate 7" rests against the inner face of the support ring 31 adjacent to the rod 8 and, as a result, when the pulling of the rod 8 is continued, the support ring 31 together with the plates 10", 12" are also displaced, and the two bearings 20 are prevented from being removed from the recesses 21. Thus, it is not necessary to provide the follower pin 22 represented in FIG. 3. It is also apparent from FIGS. 5 and 6 that the locking plate 7" together with the pairs of bearings 20 and the recesses 21 of the plates 10", 12" are hermetically encapsulated, thereby completely avoiding any soiling or corrosion of these parts.

To close the sliding device represented in FIG. 6, the push rod 8 is pressed so that the locking plate 7" and the support ring 31 and the plates 10", 12" are moved towards the conduit opening until the abutment face 33 comes into contact with the housing part 34. As the pushing action continues to be exerted on the rod 8, only the locking plate 7" can now be moved. In the course thereof, the pairs of bearings 20 are pressed out of the recesses 21, the valve plate 10" and the packing 11" are pressed against the valve seat, the counter plate 12" is pressed against the housing 25, and the pairs of bearings 20 lock the two plates 10", 12" in place in a force-locking manner as described above and prevent them from being opened as a result of pressure produced on one side.

What is claimed is:

1. A sliding device for the gas-tight and air-tight closure of an opening of given size in a body, said sliding device comprising a thick locking member (7;7';7") which is displaceable by means of a push rod (8) and which comprises a deflectable sealing plate (10;10';10") having a counter element (12; 12';12") connected therewith by means of a spring member (13,14,35) wherein the locking member (7;7';7") contains ball spreading elements (20) which rest against the sealing plate (10;10';10") and the counter element (12;12';12") to spread apart the sealing plate (10;10';10") and the counter element (12;12';12") when the locking member (7;7';7") has been moved into the closing position and to press the sealing plate (10;10';10") onto a seat of the body in a seal-tight manner through the intermediary of a narrow annular seat packing (11;11';11:), characterized in that a plurality of the spreading elements (20) are disposed in the locking member (7;7';7") along a single closed line which, in the closing position of the locking member (7;7';7"), is located between the inner boundary line of the seat packing (11;11';11") and the boundary line of the opening (2,4) such that fluid pressure which acts on the sealing plate (10;10';10") within the enclosed area of the spreading elements and which is directed in the opposite direction to the sealing pressure at the seat to effect deflection of the sealing plate in the manner of a lever arm to produce an increased sealing pressure upon the seat packing.

2. A sliding device as claimed in claim 1 wherein the locking member (7;7';7") comprises a plurality of continuous bores (19), in each of which a pair of bearings (20) whose combined diameter is greater than the length of the bore, are loosely inserted one above the other and wherein the sealing plate (10;10';10") and the counter element (12;12';12") are provided with oppositely disposed recesses (21) in which the bearings (20) engage in the opening position of the locking member (7;7';7") and from which they are forcibly removed by the closing movement of the push rod (8), thereby spreading apart the sealing plate (10;10';10") and the counter element (12;12';12") when the sealing plate is disposed opposite its seat, characterized in that the bores (19) in the locking member (7;7';7") are disposed along a closed line, the geometric form of which corresponds to the opening in the body and in that the recesses (21) in the sealing plate (10;10';10") and in the counter element (12;12';12") which are disposed along a single closed line in correspondence with the bores (19) in the locking element (7;7';7") are offset with respect to the closed line of the bores by a specific distance in the direction of displacement of the locking member (7;7';7") when the sealing plate (10;10';10") and the counter element (12;12';12") are in their spread, closing position.

3. A sliding device as claimed in claim 2 for closing a rectangular container opening, characterized in that the afore-mentioned closed lines are rectangles.

4. A sliding device as claimed in claim 2 characterized in that the aforementioned closed lines are circles.

5. A sliding device as claimed in claim 1, characterized in that the locking member (7; 7') is in the form of a plate.

6. A sliding device as claimed in claim 3, characterized in that the locking member is in the form of a frame.

7. A sliding device as claimed in claim 4, characterized in that the locking member is annular in shape.

8. A sliding device as claimed in claim 1, characterized in that the counter element (12;12') is in the form of a plate.

9. A sliding device as claimed in claim 1 for closing a container opening, characterized in that the locking member (7) is provided with rollers (6) which are guided between the container wall (1) containing the opening and a frame (3) attached to the container wall (1).

10. A sliding device as claimed in claim 1 characterized in that the locking member (7';7") is provided with rollers (6) which are guided in a slide housing (25).

11. A sliding device as claimed in claim 1, characterized in that two leaf springs (13,14), one of which is rigidly connected to the sealing plate (10;10') and the other to the counter element (12;12') are connected together by a common connecting piece (17) and the sealing plate and the counter element are retained on the locking member (7;7') by the leaf springs and are guided laterally.

12. A sliding device as claimed in claim 11, characterized in that the locking member (7;7') comprises on each side a groove (18) for the loose reception and lateral guidance of a leaf spring (13,14).

13. A sliding device as claimed in claim 11, characterized in that the connecting piece (17) is in the form of a stop piece disposed without the locking member (7;7') such that in the closing position of the locking member the connecting piece contacts an inner surface of a guide part (3;25) for the locking member and during the continued closing movement of the push rod (8) the bearings (20) are disengaged from the recesses (21).

14. A slide device as claimed in claim 2, characterized in that the locking member (7;7') is provided with a pin (22) projecting into an opening (23) in the counter element (12;12') and the dimension of the opening (23) in the direction of displacement of the locking member (7;7') corresponds generally to to the aforementioned specific distance such that, when an opening movement of the push rod (8) is effected and the bearings (20) engage in the recesses (21), the sealing plate (10;10') and the counter element (12;12') are carried along by the locking member (7;7') during its displacement and the bearings (20) are prevented from leaving the recesses.

15. A sliding device as claimed in claim 2, characterized in that between the sealing plate (10") and the counter element (12") there is disposed a supporting ring (31), the annular surfaces of which are connected to the edge regions of each the sealing plate (10") and the counter element (12") by means of bellows (30) such that the sealing plate (10"), the counter element (12"), the supporting ring (31) and the bellows (30) form a hermetically closed capsule and the locking member (7''') containing the pairs of bearings (20) is displaceably disposed inside said capsule.

16. A sliding device as claimed in claim 15, characterized in that the counter element (12") and the locking member (7") are in the form of plates; the locking member (7") comprising a central opening in which is disposed a tension spring (35) rigidly connected to both the sealing plate (10") and to the counter element.

17. A sliding device as claimed in claim 15, characterized in that the push rod (8) associated with the locking member (7") is guided through an opening in the supporting ring (31) and is sealed in this opening.

18. A sliding device as claimed in claim 15, characterized in that the supporting ring (31) is provided with rollers (6) which are guided in a slide housing (25) which comprises conduit connection ends (26).

19. A sliding member as claimed in claim 15, characterized in that the supporting ring (31) comprises an abutment face (33) such that in the closing position of the sliding device the abutment face contacts an inner face (34) of a slide housing (25) and during the continued closing movement of the push rod (8) the bearings (20) are disengaged from the recesses.

20. A sliding device as claimed in claim 2, characterized in that the locking member (7;7') is in the form of a plate.

21. A sliding device as claimed in claim 2, characterized in that the counter element (12;12') is in the form of a plate.

* * * * *